Sept. 14, 1965 C. A. CLARK 3,205,969
ENERGY CONVERSION AND POWER AMPLIFICATION SYSTEM
Filed May 4, 1961 2 Sheets-Sheet 1
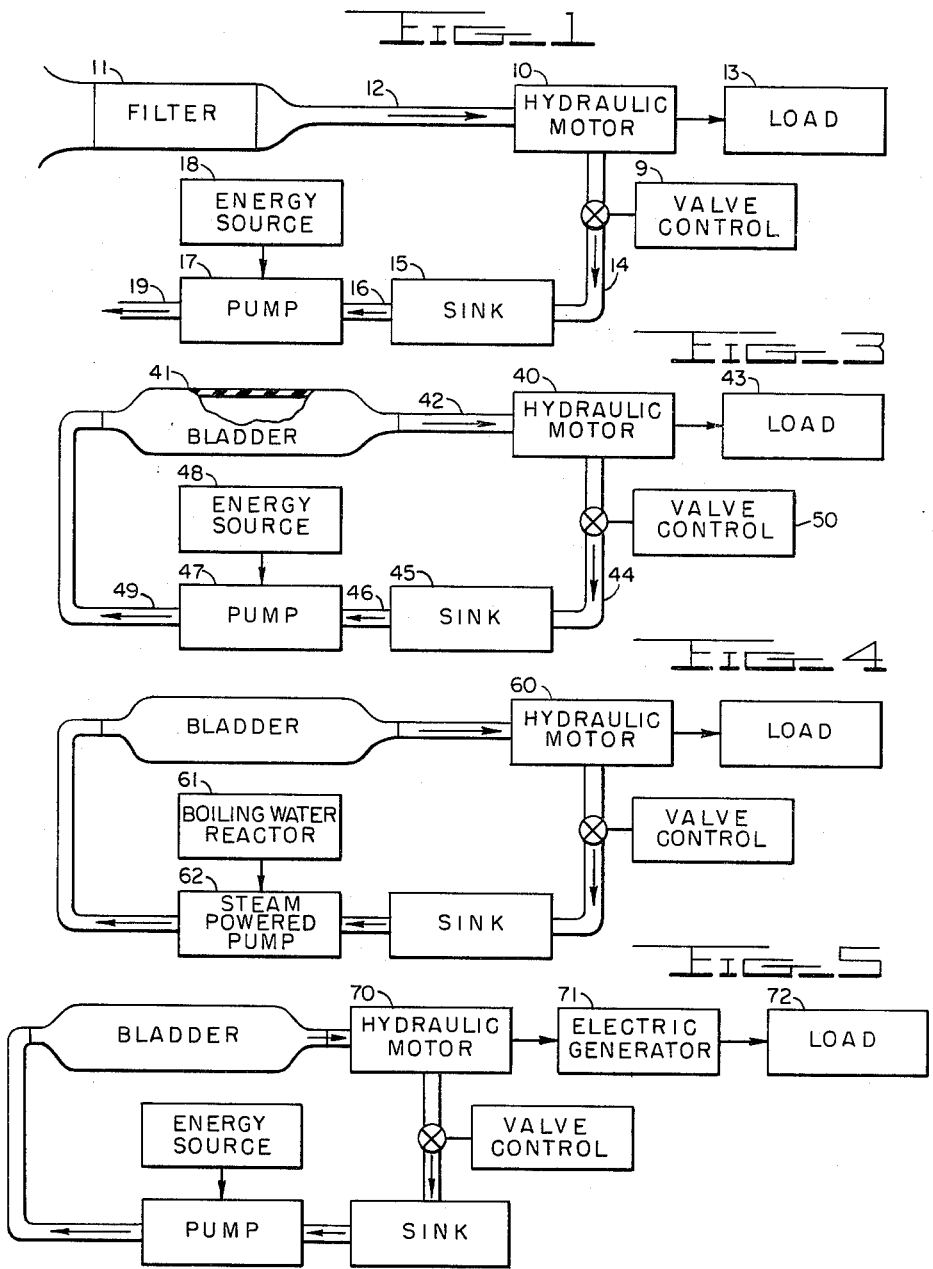
INVENTOR
CHESTER A. CLARK
AGENT
BY
ATTORNEY Sept. 14, 1965
C. A. CLARK
3,205,969
ENERGY CONVERSION AND POWER AMPLIFICATION SYSTEM
Filed May 4, 1961
2 Sheets-Sheet 2
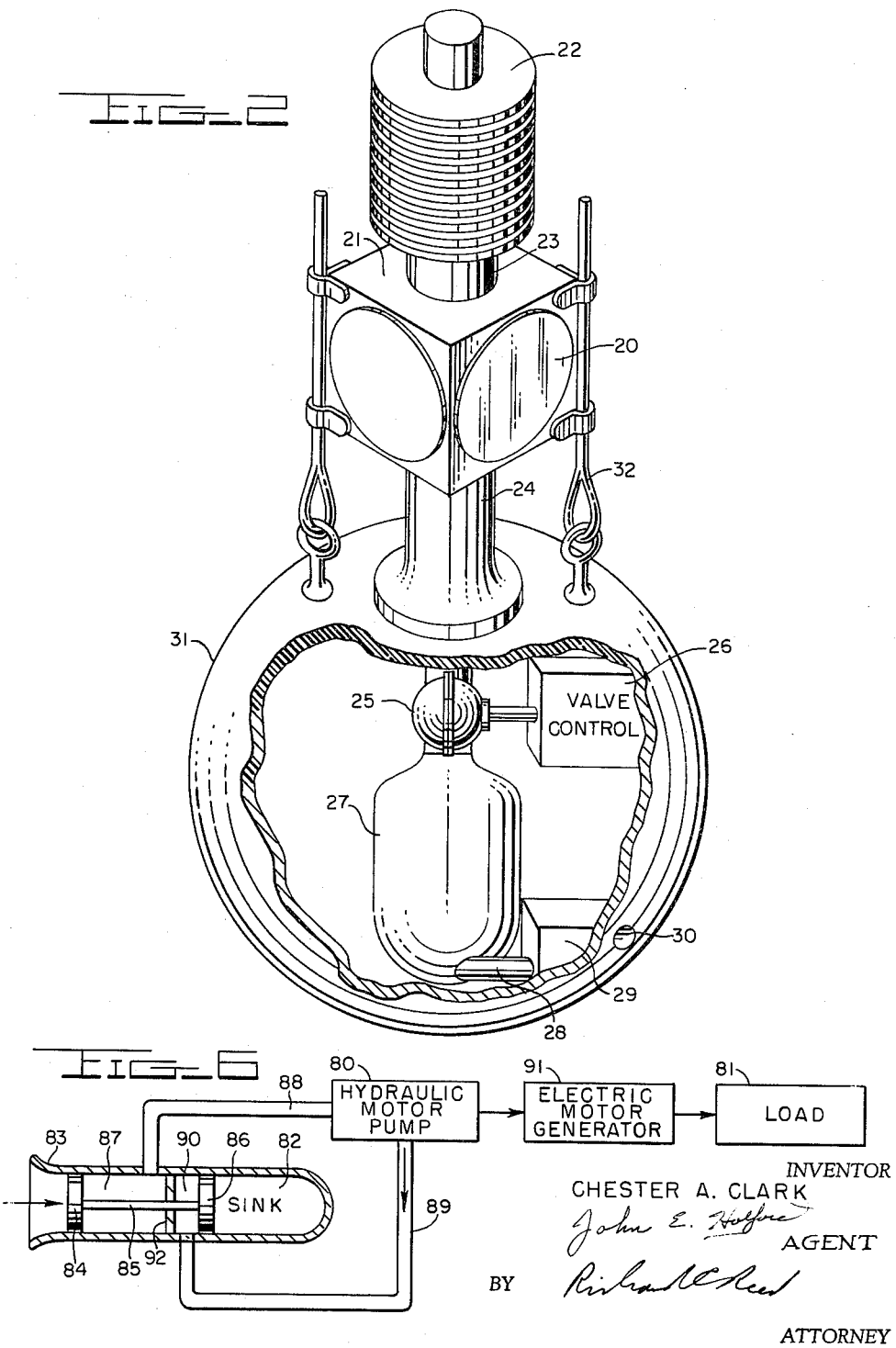
INVENTOR
CHESTER A. CLARK United States Patent Office 3,205,969
Patented Sept. 14, 1965

3,205,969
ENERGY CONVERSION AND POWER AMPLIFICATION SYSTEM
Chester A. Clark, Waldorf, Md., assignor to the United States of America as represented by the Secretary of the Navy
Filed May 4, 1961, Ser. No. 107,864
6 Claims. (Cl. 181—.5)
(Granted under Title 35, U.S. Code (1952), sec. 266)

The invention described herein may be manufactured and used by or for the Government of the United States of America for governmental purposes without the payment of any royalties thereon or therefor.

The present invention relates to energy systems requiring high power for short periods separated by much longer quiescent periods. More particularly the invention relates to systems of the type described above for use deep under the ocean, as for example, a Pulse Echo Sonar System.

The common denominator of these systems is the need for an adequate energy accumulator or storage means. A familiar example in the mechanical art is the impact wrench, where an energy is solwly stored in a spring and released suddenly to produce a hammer like blow. In the electronic art photographic flash units have been designed wherein energy is accumulated in an electrical capacitor and used to produce a pulse of visible light of very high intensity. Automobiles use chemical storage batteries to store energy over long periods of time which is quickly consumed by the starter. Other familiar systems store energy in gas under pressure or rotating fly wheels.

The systems described above all have certain drawbacks when applied to submarines or underwater unmanned buoy systems. Springs tend to lose their elasticity, crystalize and break. Capacitors suitable for high power uses are generally the electrolytic type which have a limited life-time. Pressurized gas systems tend to lose energy through heat loss, and gas leakage. Furthermore these systems require a large reservoir for unpressurized gas. Batteries like the electrical capacitors tend to have a limited lifetime and in addition produce certain by-products which can endanger equipment and personnel.

An object of the present invention, therefore is to provide a pulsed energy source which utilizes the great pressure potential available in deep bodies of water.

A further object of the invention is to provide a system for driving an underwater sound projector for a sonar system.

The invention is best understood with reference to the accompanying drawings wherein:

FIG. 1 shows a simple embodiment of the invention;
FIG. 2 shows an embodiment of the invention applied to a sonar system;
FIG. 3 shows an embodiment of the invention employing a collapsible bladder;
FIG. 4 shows an embodiment of the invention employing a low power atomic energy source;
FIG. 5 shows an embodiment of the invention driving an electrical load;
FIG. 6 shows another embodiment of the invention driving an electrical system.

In the simple embodiment shown in FIG. 1 a hydraulic motor 10, which may be a conventional piston engine or turbine for example, is directly connected to a mechanical load, as for example the propellor of a submerged submarine. By means of a valve control 9 seawater is permitted to flow through the filter 11 and the conduit 12 to operate the motor. This water then runs through a conduit 14 into a sink 15. When this system is deeply immersed in water, the water flowing through the conduit is always under great pressure providing an enormous torque to load 13 through the hydraulic motor. The filter 11 removes any foreign matter which might damage the hydraulic motor.

The fluid pump 17 is connected to the sink through a conduit 16 and removes the water in the sink 15 between operations of the valve control 9. Power for the pump 17 is obtained from the energy source 18, which may be an electrical generator or any other convenient source. Since the pump works against the ambient pressure present at the open end of conduit 19, it may be desirable in some cases to decrease the depth at which the system operates between power pulses of the hydraulic motor. If the system is completely removed from the water between operations of the hydraulic motor, the sink may be emptied merely by draining without the use of a pump. If the pump does not contain a check-valve or the pump is omitted, a check-valve should be inserted in the output of the sink.

FIGURE 2 shows an embodiment of the invention used to drive a sound projector. Operating fluid enters the system through filter 22 which is preferably a powered self cleaning edge type described in the publication by F. M. Grober, "Automotive Engineering," Pitman Publishing Co., 1940.

The fluid passes through the conduit 23 into a housing 21 wherein are mounted several transducers 20. Suitable transducers for this purpose are described in applicants co-pending patent applications Nos. 815,234, 856,306 and 40,119. The exhaust lines from the transducers pass through the stem 24 and terminate in sink chamber 27. Fuild flow is controlled by simple ball valve 25.

This valve is preferred over the gate valve or globe valve because of its ease of operation and the lack of turbulence which absorbs the available energy in the flow. The valve control 26 opens and closes valve 25 in accordance with the preselected duty cycles. The valve control may consist merely of a clock motor with suitable timing cams for opening and closing the valve at appropriate intervals. Alternately the valve control may be a simple reversible motor which is actuated by an external operator through a control cable. The chamber is drained through conduit 28 at the bottom of the same chamber by means of pump 29 having an outlet at 30. This embodiment uses an electric pump and is supplied through an electric cable (not shown).

A housing 31 surrounds the lower portion of the assembly to protect it from the great external pressure. The entire assembly may be suspended from a surface ship or a buoy by means of cables 32. Power cables from the filter 22, the valve control 26 and pump 29 may be connected to the generators of a surface ship or a nearby shore station. These devices may also be driven from self-contained batteries. Except for the electrical cables all parts of the assembly may be made from a steel or other metal which resists the attach of seawater.

FIGURE 3 shows another embodiment where the hydraulic motor 40 is driven through conduit 42 from a collapsible bladder 41. The ambient pressure outside of the bladder 41 forces the fluid through the transducer. Exhaust fluid flows by way of conduit 44 into the sink 45. Pump 47 draws the fluid from the sink through conduit 46 and forces it through conduit 49 back into the bladder.

As in the previous embodiment the pump is supplied from a low powered energy source 48 and a valve control 50 controls the flow of power to the load 43. The bladder may be made from rubber-like material or it may take the form of a metal bellows. The bladder 41 separates the fluid in system from the surrounding seawater, so that oil or a similar medium which protects and lubricates the various components may be used therein.

The embodiment shown in FIG. 4 is exactly like that in FIG. 3 except that the energy source is a boiling water reactor and the pump is a steam powered pump, having for example a steam turbine as a driving means. This system is particularly suited for use on atomic submarines.

The embodiment in FIG. 5 is like that in FIG. 3, except that instead of driving the load directly, the motor 70 drives an electric generator 71 which in turn drives the load 72. This arrangement permits the use of an electrical transducer as for example an electric motor, a piezo-electric crystal, or a magnetostrictive device.

A particularly useful arrangement for use with electrical loads is shown in FIG. 6. This system employs a hydraulically powered motor-pump 80 connected to an electric motor-generator 91 driving an electrical load. Since the hydraulic system operates at low velocity when recycling, a piston type motor-pump is preferred. A rigid tubular housing member 83 defines a pressurizing chamber 87 and a sink chamber. The two chambers are divided by a rigid dividing wall 92. The sink chamber is divided into two parts, the first chamber 90 is filled with a hydraulic fluid and the other chamber 82 is evacuated. The two portions of the sink chamber are separated by a movable plunger 86. One wall of the pressurizing chamber 87 is defined by the movable plunger 84. The ambient pressure acting on this plunger forces the hydraulic fluid from chamber 87 through the conduit 88 to the hydraulically powered motor pump 80. The connecting rod 85 connects the movable plungers 84 and 86, so that the chambers 87 and 90 change volume equally but in opposite sense. Thus the exhaust fluid from conduit 89 is drawn into the chamber 90 as the hydraulically operated unit 80 functions as a motor.

Under these conditions the motor generator operates as generator coupled to electric load 81. Due to the large torque between the hydraulic pump and the electric motor generator the generator turns at very high speed and delivers a large power to the load 81. The system will operate as described above until the plunger 86 reaches the limit of its travel in the evacuated sink 82. The system may be recycled by applying a voltage either from an internal battery or from an external source through a cable not shown to the motor generator causing it to operate as a motor. This causes the hydraulic unit 80 to operate as a pump removing fluid from the sink chamber and returning it to the chamber 87. This process continues until the plunger 86 approaches the fixed wall 92. If desired, appropriate valves may be added to the hydraulic system or switches in the electrical system in order to control the flow of energy in any desired manner.

Greater hydraulic pressures can be obtained by providing a larger evacuated cylinder and piston in contact with the seawater to drive the pistons shown.

It should be noted in all of the above embodiments that only the sink chamber is subjected to the very high differential pressures. Thus the remaining portions of the system can be made from material which is not structurally as strong as that of the sink. A typical system using a ten gallon sink chamber at a depth of 10,000 feet will deliver a thousand kilowatts over one second interval and can be recycled every minute by a 25 kw. pump.

Obviously many modifications and variations of the present invention are possible in the light of the above teachings. It is therefore to be understood that within the scope of the appended claims the invention may be practiced otherwise than as specifically described.

What is claimed is:

1. Energy conversion means for powering a load submerged in a fluid medium having a given ambient pressure comprising, a hydraulic motor adapted for connection to said load, a rigid walled sink coupled to the output of said motor for receiving exhaust fluid therefrom, said sink containing a fluid under a pressure less than said ambient pressure, an input conduit coupled to the input of said motor for supplying a driving fluid thereto, driving fluid filling said input conduit, and coupling means in contact with said fluid medium and driving fluid for transmitting fluid displacements and pressure therebetween, wherein said coupling means comprising a flexible bladder separating said fluid medium from said driving fluid.

2. Energy conversion means according to claim 1 wherein said sink includes an output conduit and said input and output conduits communicate through a check-valve to prevent driving fluid from flowing directly from the input to the output conduit.

3. Energy conversion means for powering a load submerged in a fluid medium having a given ambient pressure comprising, a hydraulic motor adapted for connection to said load, wherein said hydraulic motor being arranged to operate as a pump when driven at its output, a motor-generator means coupled to said hydraulic motor to generate electrical power and drive said hydraulic motor as a pump when electrical energy is supplied thereto, a rigid walled sink coupled to the output of said motor for receiving exhaust fluid therefrom, said sink containing a fluid under a pressure less than said ambient pressure, an input conduit coupled to the input of said motor for supplying a driving fluid thereto, driving fluid filling said input conduit, and coupling means in contact with said fluid medium and driving fluid for transmitting fluid displacements and pressure therebetween.

4. Energy conversion means for powering a load submerged in a fluid medium having a given ambient pressure comprising, a hydraulic motor adapted for connection to said load, a rigid walled sink coupled to the output of said motor for receiving exhaust fluid therefrom, said sink containing a fluid under a pressure less than said ambient pressure, an input conduit coupled to the input of said motor for supplying a driving fluid thereto, driving fluid filling said input conduit, and coupling means in contact with said fluid medium and driving fluid for transmitting fluid displacements and pressure therebetween, wherein said coupling means comprising a rigid housing surrounding said driving fluid with one external wall of said housing being a movable plunger, said housing being immersed in said fluid medium.

5. Energy conversion means for powering a load submerged in a fluid medium having a given ambient pressure comprising, a hydraulic motor adapted for connection to said load, wherein a sound transducer coupled to said hydraulic motor, a rigid walled sink coupled to the output of said motor for receiving exhaust fluid therefrom, said sink containing a fluid under a pressure less than said ambient pressure, an input conduit coupled to the input of said motor for supplying a driving fluid thereto, driving fluid filling said input conduit, and coupling means in contact with said fluid medium and driving fluid for transmitting fluid displacements and pressure therebetween.

6. An underwater sound apparatus comprising; a hydraulically operated sound transducer with a given maximum output power rating, including an open ended input conduit to permit water flow into said transducer and an output conduit; valve means in one of said conduits to control said flow; a rigid walled sink connected to said output conduit to receive water from said transducer, said sink having an output port; and pump means coupled to said output port to remove water from said sink, said pump having an output rating equal to a small fraction of the same rating of said transducer.

References Cited by the Examiner

UNITED STATES PATENTS

| | | | |
|---|---|---|---|
| 901,117 | 10/08 | McManus | 290—53 |
| 983,988 | 2/11 | Foster et al. | 60—60 |
| 2,060,684 | 11/36 | Moorhouse | 60—60 |
| 2,848,873 | 8/58 | Levetus | 60—51 |
| 2,977,764 | 4/61 | Matthews | 60—51 |
| 2,981,927 | 4/61 | McKenney | 340—3 |
| 3,003,658 | 10/61 | Miller | 60—51 |
| 3,018,627 | 1/62 | Perricci | 60—51 |

SAMUEL FEINBERG, *Primary Examiner.*

KATHLEEN CLAFFY, *Examiner.*